…

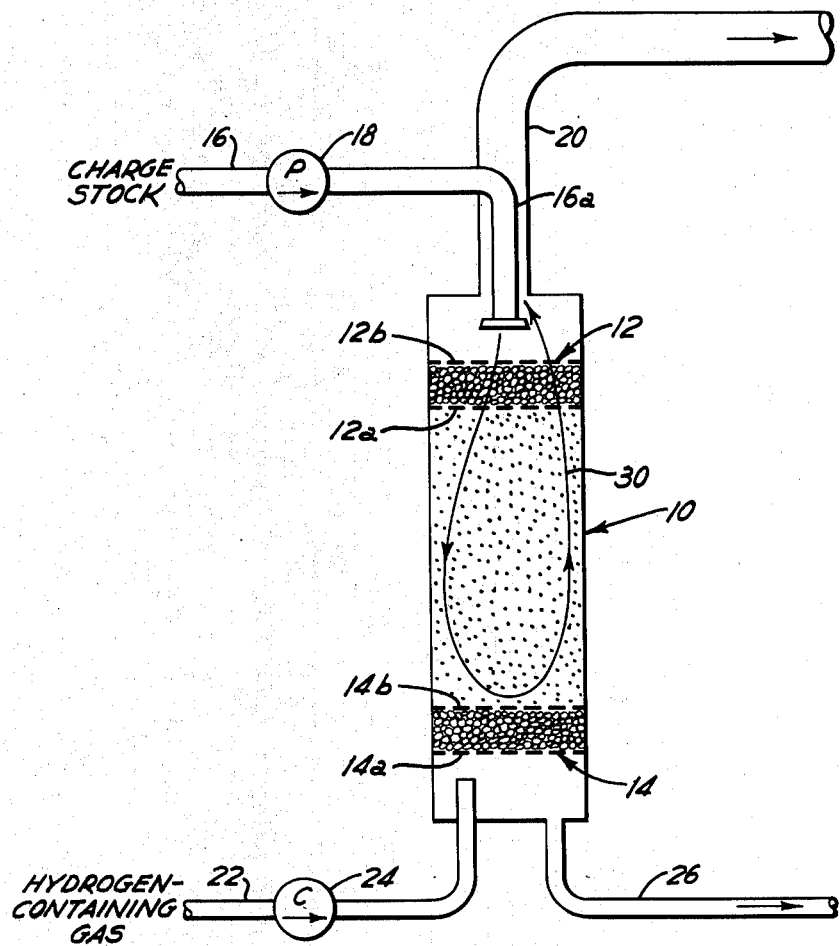

United States Patent Office 3,222,272
Patented Dec. 7, 1965

3,222,272
PROCESS FOR HYDROCRACKING OF NITROGEN CONTAINING HYDROCARBON OILS WITH COUNTERCURRENT FLOW OF THE OIL WITH HYDROGEN IN THE REACTOR
Paul G. Bercik, O'Hara Township, Allegheny County, Alfred M. Henke, Springdale, and Leslie D. Moore, Glenshaw, Pa., assignors to Gulf Research & Development Company, Pittsburgh, Pa., a corporation of Delaware
Filed Sept. 22, 1961, Ser. No. 139,962
4 Claims. (Cl. 208—111)

This invention relates to the catalytic conversion of hydrocarbons in the presence of hydrogen. More particularly, the invention relates to a process for hydrocracking petroleum fractions containing nitrogen compounds.

As is well known, petroleum fractions suitable as charge stocks for hydrocracking processes contain nitrogen compounds which tend to cause rapid deactivation of hydrocracking catalysts. It has been proposed to treat charge stocks for hydrocracking operations to reduce the nitrogen content thereof. For example, it has been proposed to contact the stocks with acids, acid ion-exchange resins and the like to reduce the nitrogen content. The nitrogen content can also be reduced by a relatively mild hydrogenation. The objective of these treatments is to reduce the nitrogen content of the charge stocks to less than 10 parts per million and preferably to no more than 2 parts per million. It is apparent that treating the charge stock to remove nitrogen increases the cost of the hydrocracking process.

It has been discovered in accordance with the invention that nitrogen-containing charge stocks can be efficiently hydrocracked over long periods without substantial catalyst deactivation by carrying out the hydrocracking process in the manner hereinafter described.

The present invention may be best understood by reference to the accompanying drawing which is a diagrammatic view of a suitable reactor for use in carrying out the process.

Referring to the drawing, there is shown a reactor 10 with a distributing means 12 in its upper part. The distributing means 12 comprises a lower metal screen 12a which supports a bed of quartz chips or other similar particulate porous solid. The upper surface of the quartz chips is confined by a similar metal screen 12b. A similar distributing means 14 is located in the lower part of the reactor. Thus, a metal screen 14a supports a bed of quartz chips which is confined also by an upper screen 14b. The distributing means 14, particularly the metal screen 14b, supports a bed of a solid hydrocracking catalyst which is in the form of pellets or other solid particles. Ordinarily the reactor space defined by screen 14b and screen 12a will be substantially filled with the catalyst. The charge is introduced into the reactor through a line 16 and a pump 18. The outer end, 16a, of line 16 is disposed in a product outlet line 20. In a preferred method of practicing the invention, substantially all of the hydrocracked products will be removed through line 20.

The reactor 10 in its bottom portion is equipped with a line 22 having a compressor 24. The hydrogen for the process, which may be pure hydrogen or a hydrogen rich gas containing, for example, 85 percent hydrogen is introduced into the reactor below distributing means 14 and flows upwardly through the reactor and any excess hydrogen leaves the reactor through the product line 20. The reactor is also supplied with a line 26 which under some conditions of operation is used to withdraw product from the reactor. The product withdrawn through line 26, however, is never more than a minor fraction of the total product leaving the reactor and should not constitute more than about 20 percent of the total product. Any product withdrawn through line 26 may be utilized as recycle charge stock.

When employing a reactor assemblage as described and shown in the drawing, a hydrocracking run is initiated by first filling the reactor space between the distributing means 12 and 14 with a solid hydrocracking catalyst in the form of pellets or particles. Then the catalyst bed is pressured with flowing hydrogen to 750 p.s.i.g. (pounds per square inch gauge). The catalyst bed is heated to a selected elevated temperature, which will generally be about 750° F. and hydrogen is flowed through the bed until the catalyst has been reduced. Thereafter hydrogen is flowed into the reactor to raise the pressure to the desired processing pressure. Before introducing the charge into the reactor, the temperature in the reactor should be about 25° to 100° F. less than the desired run temperature as the hydrocracking reaction is an exothermic reaction. This starting procedure comprising a high temperature assures that the catalyst will not be contaminated with nitrogen from the charge stock.

It is apparent that the process of the invention is neither co-current nor countercurrent but has characteristics of both of these process types. Referring again to the drawing, the path of the average particle of charge is represented by curve 30. Thus, the fresh charge entering the reactor 10 through line 16 flows downwardly and countercurrently with respect to the hydrogen entering the reactor through line 22 as long as the charge or products remain essentially in the liquid phase. However, because at least about 80 percent, and preferably at least 90 percent, of the product is taken from the top of the reactor, the product particles are vaporized during the course of the reaction and flow upwardly and co-currently with the hydrogen in contact with the catalyst bed. When conditions are adjusted so that at least 90 percent of the product goes overhead, it has been found that the catalyst remains active for long periods.

It will be understood that in practicing this invention the process conditions, i.e., temperatures, pressures, space velocities, hydrogen circulation, and the like, will be varied in view of the nature of the charge stock, the desired product, and in view of the other variables employed. However, the process variables are those which are employed in conventional hydrocracking processes and, in general, will be designed to introduce the charge as a liquid and remove the desired product as condensible vapors. Thus, temperatures with the range of about 675° to 950° F. can be used and ordinarily the temperatures should be in the range of 700° to 850° F. Space velocities (liquid hourly space velocity) may range from 0.2 to 3.0 and preferably the space velocity should be within the range of 0.5 to 1.5. The hydrogen gas circulation measured in standard cubic feet of hydrogen per barrel of charge may range from 1200 to 10,000 standard cubic feet per barrel or higher and preferably 2000 to 10,000 or greater standard cubic feet per barrel of hydrogen may be used. It is noted here that in the following examples the value for the standard cubic feet of hydrogen per barrel of charge is based on 100 percent hydrogen content. For furnace oil production, the hydrogen circulation rate should be greater than 10,000 standard cubic feet of hydrogen per barrel of charge.

While the invention is not limited to any theory, it is believed that at least substantially all of the hydrocracking occurs while the charge is in the liquid phase and the products leave the top of the reactor in the vapor phase. Lighter components of the charge in some cases may be vaporized and leave the reactor without substantial conversion. As stated above, the process should be carried out so that at least 80 percent of the product leaves the reactor from the top. If the process is carried out in this manner, a long run can be made during which the product distribution does not change, showing that the catalyst has not aged even though the charge may contain nitrogen compounds.

This invention will be understood more fully by reference to the tables supplying data with respect to a number of runs in accordance with the invention and runs that are outside the scope of the invention. In the following Table 1 there is set out the data with respect to the application of the present process to two charge stocks which are identified in the table. The hydrocracking catalyst employed in the runs shown in Table 1 was a nickel tungsten catalyst supported on a silica-alumina composite containing 75 percent silica and 25 percent alumina by weight. The completed catalyst comprised 6 percent nickel and 19 percent tungsten by weight of the finished catalyst. The catalyst also contained 1.5 percent fluorine by weight.

In Table 1 and the following tables, "N, p.p.m." means the parts of nitrogen in a million parts of the charge by weight. "S, percent by wt." means the percent of sulfur by weight in the charge. "LHSV" means the liquid hourly space velocity.

| Run No | 1 | 2 | 3 | 4 |
|---|---|---|---|---|
| Charge stock | S. Louisiana virgin furnace oil | | Heavy fluid catalytic cracking gas oil | |
| Inspections: | | | | |
| Gravity, °API | 38.6 | | 20.7 | |
| N, p.p.m. | 28 | | 560 | |
| S, Percent by wt | 0.08 | | 1.55 | |
| Aromatics, Percent by vol | 21.5 | | 54.8 | |
| Distillation: | | | | |
| 10% pt., °F | 424 | | 593 | |
| 90% pt., °F | 580 | | 719 | |
| Process conditions: | | | | |
| Temp., °F | 750 | 750 | 750 | 750 |
| Press., p.s.i.g | 2,000 | 1,000 | 3,000 | 2,000 |
| LHSV | 1.0 | 1.0 | 1.0 | 1.0 |
| H₂ rate, s.c.f./bbl | 10,000 | 10,000 | 10,000 | 10,000 |
| Product split, Percent Overhead: | | | | |
| 10 hrs | 100 | 100 | 100 | 100 |
| 30 hrs | 100 | 100 | 100 | 100 |
| 100 hrs | | | | 100 |
| Total product, gravity °API: | | | | |
| 10 hrs | 56.5 | 37.4 | 53.2 | 53.8 |
| 30 hrs | 56.9 | 37.0 | 54.4 | 54.9 |
| 100 hrs | | | | 54.8 |

Referring to Table 1, and particularly to Runs 1 and 2, all of the effluent from the reactor in both runs was recovered as overhead. However, by comparing the results of these two runs it is apparent that a better result was obtained in Run 1. The gravity (°API) of the product is higher and more gasoline is produced. Thus, for this relatively low-boiling charge stock, a pressure of 2000 p.s.i.g. is better than 1000 p.s.i.g. In Run 2, while the product went overhead, it is apparent that little conversion was accomplished for at 1000 p.s.i.g. the charge stock vaporized rapidly and was not in contact with the catalyst a sufficient time for the hydrocracking to occur.

Referring again to the data in Table 1, for Runs 3 and 4 in which the charge is a heavy gas oil from the product of a fluid catalytic cracking operation, it is apparent that the process of this invention yields excellent results on this type of charge stock despite the fact that this stock contains 560 p.p.m. nitrogen. The results of the runs show that little or no deactivation of the catalyst occurred. In Run 4, 100 percent of the product was recovered overhead through 100 hours of operation and the gravity of the product remained substantially the same throughout the run. This indicates little or no aging of the catalyst with a charge stock most difficult to hydrocrack because of its high nitrogen content. Run 3 at 3000 p.s.i.g. was also successful.

The results obtainable by the process of the invention are further illustrated by treatment of a vacuum gas oil fraction of Kuwait crude oil. The inspections for this gas oil are as follows:

| | |
|---|---|
| Gravity, °API | 21.4 |
| N, p.p.m. | 890 |
| S, percent by wt. | 3.05 |
| Aromatics, percent by vol. | 36.5 |
| Distillation: | |
| 10% pt., °F | 651 |
| 90% pt., °F | 934 |

This stock was charged to a hydrocracking operation involving flow of charge and hydrogen as described above. The process conditions and results of the operation of the process in accordance with this invention are set out in the following Table 2.

Table 2

| Run No | 5 | 6 | 7 | 8 | 9 | 10 | 11 |
|---|---|---|---|---|---|---|---|
| Process conditions: | | | | | | | |
| Temp., °F | 750 | 750 | 750 | 750 | 750 | 750 | 750 |
| Press., p.s.i.g | 1000 | 1000 | 2000 | 2000 | 2000 | 3000 | 3000 |
| LHSV | 0.5 | 1.0 | 0.5 | 1.0 | 2.0 | 1.0 | 2.0 |
| H₂ rate, s.c.f./bbl | 10,000 | 10,000 | 10,000 | 10,000 | 10,000 | 10,000 | 10,000 |
| Product split, percent overhead: | | | | | | | |
| 10 hrs | 29 | 16 | 100 | 100 | 10 | 79 | 30 |
| 30 hrs | 20 | 13 | 97 | 50 | | | |
| 100 hrs | | | 86 | 32 | | | |
| 200 hrs | | | 64 | | | | |
| Total product, Gravity, °API: | | | | | | | |
| 10 hrs | 34.6 | 28.0 | 65.8 | 52.3 | 28.0 | 63.6 | 35.8 |
| 30 hrs | 31.0 | 25.2 | 64.3 | 40.7 | 24.4 | 63.0 | 35.5 |
| 100 hrs | | | 58.1 | 35.2 | | | |
| 200 hrs | | | 54.5 | | | | |

It will be seen from the results set out in this table that under the process conditions shown, both a virgin furnace oil and a heavy gas oil obtained from the product of a fluid catalytic cracking unit can be efficiently hydrocracked using the process of the invention. The table also shows that to employ the most efficient process conditions for the particular stock it is desirable to make one or more trial runs, using however, the range of conditions set out herein.

The data in Table 2 illustrate further the fact that when a particular stock is to be employed as charge to the process, tests should be made to determine the proper process conditions for that stock. The catalyst employed was the same as that used in the runs, the results of which are shown in Table 1.

The only runs which come within the scope of the invention are Runs 7, 8 and 10 as the conditions for the other runs did not cause at least 80 percent of the product to leave the reactor from the top of the reactor.

In order to illustrate the invention more fully, a series of runs employing a reactor system as disclosed in the drawing were carried out using a furnace oil recovered from the product of a fluid catalytic cracking operation. The inspections of this furnace oil are as follows:

Gravity, ° API _____ 20.9
N, p.p.m. _____ 280
S, percent by wt. _____ 2.03
Aromatics, percent by vol. _____ 64.3
Distillation:
    10% pt., ° F. _____ 506
    90% pt., ° F. _____ 610

The catalyst employed in this work was the nickel-tungsten catalyst described heretofore.

scribed. The inspections of this catalytic cracking charge stock are as follows:

Gravity ° API _____ 32.4
N, p.p.m. _____ 404
S, percent by wt. _____ 0.91
Aromatics, percent by vol. _____ 27.0
Distillation:
    10% pt., ° F. _____ 511
    90% pt., ° F. _____ 748

Table 4

| Run No. | 19 | 20 | 21 | 22 | 23 | 24 | 25 |
|---|---|---|---|---|---|---|---|
| Process conditions: | | | | | | | |
|   Temp., ° F. | 650 | 700 | 750 | 750 | 800 | 800 | 750 |
|   Press., p.s.i.g. | 1000 | 1000 | 1000 | 1000 | 1000 | 1000 | 1750 |
|   LHSV | 0.5 | 0.5 | 0.5 | 1.0 | 1.0 | 1.0 | 1.0 |
|   H₂ rate, s.c.f./bbl | 10,000 | 10,000 | 10,000 | 10,000 | 10,000 | 5,000 | 5,000 |
| Product split, percent overhead: | | | | | | | |
|   10 hrs | 56.4 | 100 | 100 | 100 | 100 | 100 | 100 |
|   30 hrs | -------- | 100 | -------- | -------- | -------- | -------- | 100 |
|   100 hrs | -------- | -------- | -------- | -------- | -------- | -------- | 100 |
| Total product, gravity, ° API: | | | | | | | |
|   10 hrs | 47.0 | 55.5 | 54.4 | 39.6 | 36.9 | 42.6 | 55.6 |
|   30 hrs | -------- | 56.1 | -------- | -------- | -------- | -------- | 58.3 |
|   100 hrs | -------- | -------- | -------- | -------- | -------- | -------- | 58.2 |

Table 3

| Run No. | 12 | 13 | 14 | 15 | 16 | 17 | 18 |
|---|---|---|---|---|---|---|---|
| Process conditions: | | | | | | | |
|   Temp., ° F. | 600 | 600 | 700 | 700 | 750 | 750 | 750 |
|   Press., p.s.i.g. | 750 | 750 | 1000 | 1000 | 1000 | 1000 | 1750 |
|   LHSV | 1.0 | 0.5 | 0.5 | 0.5 | 0.5 | 0.5 | 0.5 |
|   H₂ rate, s.c.f./bbl | 10,000 | 10,000 | 10,000 | 5,000 | 10,000 | 5,000 | 5,000 |
| Product split, percent overhead: | | | | | | | |
|   10 hrs | 7 | 6 | 96 | 65 | 82 | 60 | 100 |
|   60 hrs | -------- | -------- | 95 | -------- | -------- | -------- | 89 |
|   200 hrs | -------- | -------- | -------- | -------- | -------- | -------- | 73 |
| Total product, gravity, ° API: | | | | | | | |
|   10 hrs | 25.0 | 25.9 | 49.8 | 48.4 | 49.5 | 41.0 | 56.7 |
|   60 hrs | -------- | -------- | 49.4 | -------- | -------- | -------- | 53.9 |
|   200 hrs | -------- | -------- | -------- | -------- | -------- | -------- | 49.5 |

It is apparent from what has been said above, that only Runs 14, 16 and 18 of this table come within the scope of this invention. These runs are especially interesting in that although 89 percent of the product is still going overhead from the reactor after 60 hours on-stream in Run 18, in this run catalyst deactivation subsequently occurs, whereas in Run 14 no catalyst deactivation is apparent when more than 90 percent of the product comes overhead. Accordingly, while a run in which 80 percent of the product goes overhead is a reasonably successful run, catalyst deactivation may occur, whereas no such deactivation occurs when at least 90 percent of the product goes overhead.

To further illustrate the invention, there is set out in the following Table 4 the results obtained when charging a light catalytic cracking charge stock to a hydrocracking unit containing the nickel-tungsten catalyst already described.

All of the runs described in this table, except Run 19, are within the scope of this invention in regard to the recovery of at least 80 percent of the product from the top of the reactor. The temperature was apparently too low in Run 19 to obtain the desired degree of hydrocracking. The lack of cracking activity in Runs 22, 23 and 24 resulted from a combination of high temperature and low pressure causing the charge stock to vaporize and leave the reactor before it was in contact with the catalyst a sufficient time for the hydrocracking to occur.

Any hydrocracking catalyst may be used in carrying out the process of the invention, such as catalysts comprising platinum or palladium deposited on an acidic base such as composites of silica and alumina, silica and magnesia, and the like. These catalysts can be deactivated by long contact with sulfur at high temperatures. Accordingly, the hydrocracking catalyst employed is preferably a sulfactive catalyst such as the nickel-tungsten catalyst previously described. Other examples of sulfactive catalysts are catalysts comprising composites above described on which are disposed metals, or oxides and sulfides of metals selected from the group consisting of chromium, molybdenum, cobalt, nickel and tungsten.

The data in the following Table 5 illustrates a method for increasing the furnace oil yield in preference to gasoline production for a particular charge stock by control of the operating conditions using the process of the invention. The inspections for the charge stock, a vacuum gas oil fraction of Kuwait crude oil, are as follows:

Gravity, ° API _____ 21.4
N, p.p.m. _____ 890
S, percent by wt. _____ 3.05
Aromatics, percent by vol. _____ 36.5
Distillation:
　10% pt., ° F. _____ 651
　90% pt., ° F. _____ 934

*Table 5*

| Run No | 26 | 27 | 28 | 29 | 30 | 31 | 32 | 33 |
|---|---|---|---|---|---|---|---|---|
| Process conditions: | | | | | | | | |
| Temp., ° F | 750 | 750 | 750 | 750 | 825 | 825 | 825 | 825 |
| Press., p.s.i.g | 2000 | 2000 | 2000 | 2000 | 2000 | 2000 | 2000 | 1500 |
| LHSV | 0.5 | 0.5 | 0.5 | 0.5 | 0.5 | 1.0 | 1.0 | 1.0 |
| $H_2$ rate, s.c.f./bbl | 10,000 | 20,000 | 30,000 | 40,000 | 40,000 | 40,000 | 20,000 | 20,000 |
| Product split, percent overhead | 100 | 100 | 100 | 100 | 100 | 100 | 100 | 100 |
| Total product, gravity, ° API | 57.4 | 54.4 | 49.6 | 45.0 | 42.0 | 35.4 | 46.9 | 42.1 |
| Distillation, percent by wt.: | | | | | | | | |
| Gasoline 100–350° F | 46 | 52 | 43 | 23 | 23 | 12.5 | 32 | 23 |
| Furnace oil 350–650° F | 35 | 42 | 56 | 65 | 60 | 45 | 55 | 63 |
| Product ratio, furnace oil/gasoline | .76/1 | .79/1 | 1.3/1 | 2.8/1 | 2.6/1 | 3.6/1 | 1.7/1 | 2.7/1 |

The data show that furnace oil (350–650° F.) can be produced in preference to gasoline by operating with hydrogen rates in excess of 10,000 cubic feet per barrel of charge stock.

Obviously many modifications and variations of the invention as hereinbefore set forth may be made without departing from the spirit and scope thereof, and therefore only such limitations should be imposed as are indicated in the appended claims.

We claim:

1. In the process for hydrocracking a hydrocarbon oil containing a nitrogen compound which comprises the steps of disposing a solid hydrocracking catalyst whose activity is reduced by contact with nitrogen compounds in a single stage reaction zone, maintaining in said zone a temperature within the range of about 675° F. to 950° F. and a pressure of about 750 to 3,000 pounds per square inch, contacting the hydrocarbon oil with hydrogen in said reaction zone utilizing a space velocity between about 0.2 and 3, and removing the hydrocracked products from said reaction zone whereby a substantial fraction of the hydrocarbon is hydrocracked, the improvement which comprises contacting said hydrocarbon oil with hydrogen by introducing the hydrocarbon oil into the upper portion of said reaction zone and causing it to flow downwardly into said reaction zone, introducing said hydrogen into the lower portion of said reaction zone and causing it to flow upwardly through said reaction zone and utilizing specific temperatures and pressures within the ranges specified which result in the removal of at least 80 percent of the hydrocracked product from the top of the reaction zone.

2. The improvement as defined in claim 1 wherein the catalyst comprises an acidic cracking base, on which is disposed at least one member of the group consisting of chromium, molybdenum, tungsten, cobalt, and nickel, their oxides and sulfides.

3. In the process for hydrocracking a hydrocarbon oil containing nitrogen compounds which comprises the steps of disposing a solid hydrocracking catalyst whose activity is reduced by contact with nitrogen compounds in a single stage reaction zone, maintaining in said zone a temperature within the range of about 700° F. to 850° F. and a pressure of about 1,000 to 2,000 pounds per square inch, contacting the hydrocarbon oil with hydrogen is said reaction zone, and removing the hydrocracked product from said reaction zone utilizing a space velocity between about 0.5 and 1.5 whereby a substantial fraction of the hydrocarbon is hydrocracked, the improvement which comprises contacting said hydrocarbon oil with hydrogen by introducing the hydrocarbon oil into the upper portion of said reaction zone and causing it to flow downwardly into said reaction zone, introducing said hydrogen into the lower portion of said reaction zone and causing it to flow upwardly through said reaction zone at a rate of about 1,200 to 10,000 standard cubic feet per barrel of said hydrocarbon oil; and utilizing specified temperatures and pressures within the ranges specified which result in the removal of at least 80 percent of the hydrocracked product from the top of the reaction zone.

4. In the improvement as defined in claim 3 in which at least 90 percent of the hydrocracked product is removed from the top of the reaction zone.

References Cited by the Examiner

UNITED STATES PATENTS

| 2,911,356 | 11/1959 | Hanson | 208—110 |
| 2,952,626 | 9/1960 | Kelly et al. | 208—254 |
| 2,993,855 | 7/1961 | Fear | 208—213 |

DELBERT E. GANTZ, *Primary Examiner.*

ALPHONSO D. SULLIVAN, JOSEPH R. LIBERMAN,
　　*Examiners.*

UNITED STATES PATENT OFFICE
CERTIFICATE OF CORRECTION

Patent No. 3,222,272                                        December 7, 1965

Paul G. Bercik et al.

It is hereby certified that error appears in the above numbered patent requiring correction and that the said Letters Patent should read as corrected below.

Column 3, above the table, insert as a heading "Table 1"; same column, same table, second column and opposite "Gravity, °API", for "38.6" read -- 36.6 --; column 8, line 31, for "is" read -- in --.

Signed and sealed this 20th day of September 1966.

(SEAL)
Attest:

ERNEST W. SWIDER
Attesting Officer

EDWARD J. BRENNER
Commissioner of Patents